A. J. MANSFIELD.
VEHICLE WHEEL.
APPLICATION FILED NOV. 12, 1912.
1,085,923.
Patented Feb. 3, 1914.
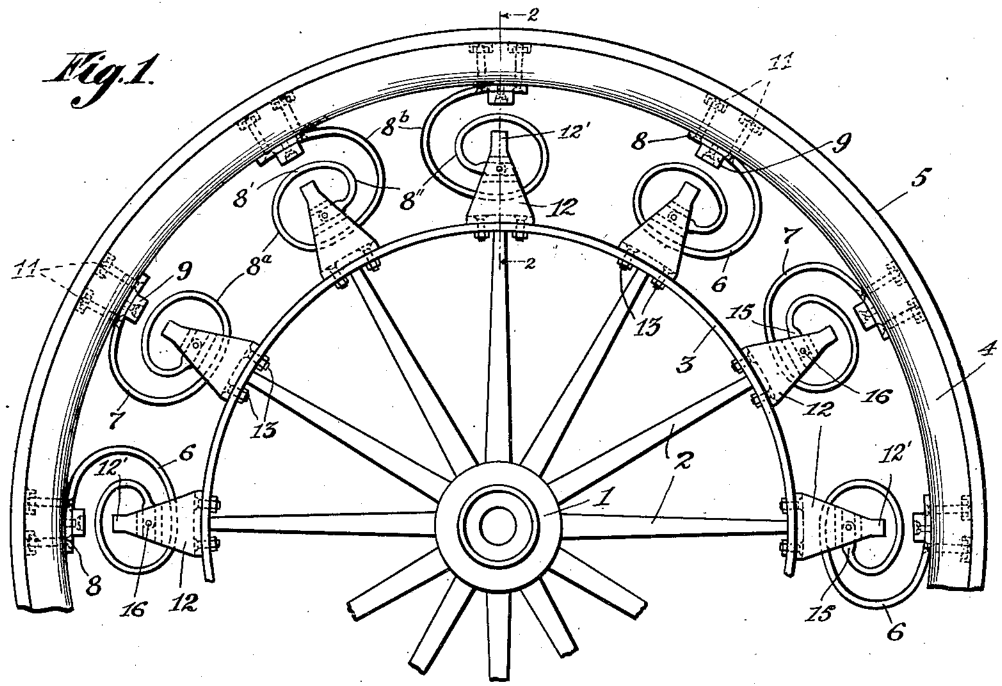
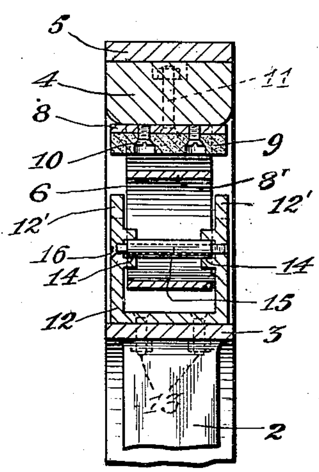
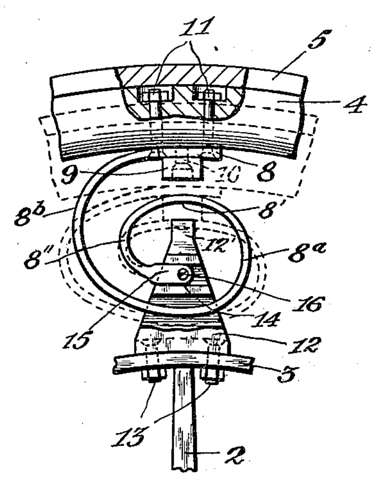
Inventor
Witnesses
James E. Sproll.
Clara A. Harm.
Auby J. Mansfield.
By
Stephen A. Brooks
Attorney

UNITED STATES PATENT OFFICE.

AUBY J. MANSFIELD, OF SEATTLE, WASHINGTON.

VEHICLE-WHEEL.

1,085,923. Specification of Letters Patent. Patented Feb. 3, 1914.

Application filed November 12, 1912. Serial No. 730,956.

*To all whom it may concern:*

Be it known that I, Auby J. Mansfield, a citizen of the United States of America, and a resident of the city of Seattle, in the county of King and State of Washington, have invented certain new and useful Improvements in Vehicle-Wheels, of which the following is a specification.

My invention has reference to vehicle wheels of the type provided with springs to neutralize shock and vibration, and aims primarily to provide a construction having the springs in novel form and arrangement.

Other objects will be set forth as my description progresses, and those features of construction, arrangements and combinations of parts on which I desire protection succinctly defined in my annexed claims.

Referring to the accompanying drawing in which I have shown a preferred embodiment of my invention, Figure 1 is a fragmentary side elevation. Fig. 2 is a vertical transverse section on line 2—2 of Fig. 1. Fig. 3 is a fragmentary elevation with parts broken away, illustrating one of the springs connected with the outer and inner rim sections, and showing by dotted lines the outer rim section moved inwardly as under pressure of the load.

Referring to the drawing by numerals of reference, 1 indicates the hub, 2 the spokes, 3 an inner rim section rigidly connected to spokes 2, all of which can be of any suitable or desired construction.

Reference numeral 4 indicates an outer rim section provided with a suitable tire, as 5.

Interposed between rim sections 3 and 4 are a plurality of flat helical springs 6 and 7, these having their axes disposed parallel or substantially parallel to the axis of hub 1. Springs 6 which alternate with springs 7 are set so that they curve in the direction opposite to that of the direction of curve of the springs 7 whereby the springs serve to more effectually prevent peripheral movement of rim section 4 relatively to rim section 3 in either direction. The outer end portions of springs 7 and 6 therefore face one another, and in accordance with my invention I preferably enlarge each end portion, as at 8, to provide broad bearing portions which are faced, as at 9, with leather, rubber or other suitable material which is conveniently secured to end portion 8 by screws 10.

Reference numeral 11 indicates bolts employed for fastening the outer end portion of the springs to rim section 4.

Reference numeral 12 indicates holders fixed to rim section 3, as by bolts 13, these holders being substantially U-shaped in cross section and having their side walls formed with spaced shoulders providing therebetween seats 14. Each spring has its inner end portion enlarged, as at 15, for engagement in seats 14 of its related holder, and through each enlarged portion a screw bolt 16 is passed to thereby rigidly connect the inner end portion of the spring to rim section 3, as more clearly shown in Figs. 2 and 3.

Springs 6 and 7 which are identical in construction, each extends around its bolt 16 and then outwardly to bring its outer end portion 8 directly over or outwardly of the bolt in a line substantially radial to hub 1. By such construction, I provide the spring with an intermediate bearing portion 8′ directly opposing bearing 8 and normally spaced therefrom and from the upper end portions 12′ of holder 12, the said bearing portion 8′ extending parallel to the inner end of the spring and being connected therewith by a bend 8″. The opposite end of bearing portion 8′ is connected by a curved portion $8^a$ extending beneath the inner end of the spring and merging into an outwardly curved section $8^b$, extending to bearing portion 8 in a plane substantially perpendicular to the axis of hub 1. Under heavy strains or pressure, spring bearing portion 8 cushioned by the buffer 9, will be brought into engagement with portion 8′ and receive direct yielding support therefrom, limited by end portions or stops 12′ of support 12, these stops preventing rupture of the spring, as will be readily understood.

Having thus described my invention what I claim as new, and desire to secure by Letters Patent of the United States of America, is:—

1. A spring wheel comprising a rim composed of inner and outer sections, a hub connected to the inner section of said rim, flat helical springs secured at one end to the outer rim section, substantially U-shaped holders on the inner rim section, the sides of said holders being provided with transverse seats, and means securing the other ends of said springs in the seats provided in said holders, said seat retaining the seated ends from movement.

2. A spring wheel comprising a rim composed of inner and outer sections, a hub connected to the inner section of said rim, flat helical springs secured at one end to the outer rim section, flexible facings secured to the outer end portions of said springs, substantially U-shaped holders on the inner rim section, and means securing the other ends of said springs to said holders, the sides of said holders being extended to form stops for engagement by the flexible facings aforesaid.

3. A spring wheel comprising a rim composed of inner and outer sections, a hub connected to the inner rim section, flat helical springs secured at one end to the outer rim section, flexible facings secured to the outer end portions of said springs, substantially U-shaped holders on the inner rim section, and means securing the other ends of the springs to said holders, said springs having their intermediate portions curved about their last mentioned ends, and the sides of the holders being extended to receive the intermediate curved portions of the springs therebetween and to provide stops for engagement by the flexible facings aforesaid, the latter engaging the intermediate curved portions of the springs prior to engaging the aforesaid stops.

4. A spring wheel comprising a rim composed of inner and outer sections, a hub connected to the inner rim section, flat helical springs secured at one end to the outer rim section, and substantially U-shaped holders on said inner rim sections provided with transverse seats, the inner ends of said springs being enlarged and received in said seats to prevent swinging movement of said enlarged ends.

Signed at Seattle, Washington, this 4th day of November, 1912.

AUBY J. MANSFIELD.

Witnesses:
STEPHEN A. BROOKS,
E. ARLITA ADAMS.

Copies of this patent may be obtained for five cents each, by addressing the "Commissioner of Patents, Washington, D. C."